United States Patent
Endert et al.

(10) Patent No.: US 10,255,355 B2
(45) Date of Patent: Apr. 9, 2019

(54) METHOD AND SYSTEM FOR INFORMATION RETRIEVAL AND AGGREGATION FROM INFERRED USER REASONING

(71) Applicants: Alexander Endert, Spartanburg, SC (US); Nicholas O. Cramer, Richland, WA (US); Ralph J. Perko, III, Richland, WA (US); Shawn D. Hampton, Kennewick, WA (US); Edwin R. Burtner, Richland, WA (US); Kristin A. Cook, Richland, WA (US)

(72) Inventors: Alexander Endert, Spartanburg, SC (US); Nicholas O. Cramer, Richland, WA (US); Ralph J. Perko, III, Richland, WA (US); Shawn D. Hampton, Kennewick, WA (US); Edwin R. Burtner, Richland, WA (US); Kristin A. Cook, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 429 days.

(21) Appl. No.: 14/723,391

(22) Filed: May 27, 2015

(65) Prior Publication Data
US 2015/0347576 A1     Dec. 3, 2015

Related U.S. Application Data

(60) Provisional application No. 62/003,856, filed on May 28, 2014.

(51) Int. Cl.
*G06F 17/30* (2006.01)

(52) U.S. Cl.
CPC .. *G06F 17/30719* (2013.01); *G06F 17/30643* (2013.01); *G06F 17/30713* (2013.01); *G06F 17/30412* (2013.01); *G06F 17/30554* (2013.01)

(58) Field of Classification Search
None
See application file for complete search history.

(56) References Cited

U.S. PATENT DOCUMENTS

| | | | | |
|---|---|---|---|---|
| 6,233,575 | B1* | 5/2001 | Agrawal | G06F 17/3071 |
| 9,049,249 | B2* | 6/2015 | Zhang | H04L 67/306 |
| 9,195,640 | B1* | 11/2015 | Donneau-Golencer | G06F 17/28 |
| 2009/0063538 | A1* | 3/2009 | Chitrapura | G06F 17/30887 |
| 2009/0313573 | A1* | 12/2009 | Paek | G06F 3/0482 715/780 |
| 2013/0064109 | A1* | 3/2013 | Combet | G06Q 30/02 370/252 |
| 2014/0253417 | A1* | 9/2014 | Brown | G06F 3/1446 345/2.3 |

* cited by examiner

*Primary Examiner* — Jau Shya Meng
(74) *Attorney, Agent, or Firm* — Haverstock & Owens LLP (57) ABSTRACT

The visual analytic system enables information retrieval within large text collections. Typically, users have to directly and explicitly query information to retrieve it. With this system and process, the reasoning of the user is inferred from the user interaction they perform in a visual analytic tool, and the appropriate information to query, process, and visualize is systematically determined.

33 Claims, 8 Drawing Sheets

METHOD AND SYSTEM FOR INFORMATION RETRIEVAL AND AGGREGATION FROM INFERRED USER REASONING

CROSS-REFERENCE TO RELATED APPLICATION(S)

This application claims priority under 35 U.S.C. § 119(e) of the U.S. Provisional Patent Application Ser. No. 62/003,856, filed May 28, 2014 and titled, "METHOD AND SYSTEM FOR INFORMATION RETRIEVAL AND AGGREGATION FROM INFERRED USER REASONING," which is hereby incorporated by reference in its entirety for all purposes.

STATEMENT REGARDING FEDERALLY SPONSORED RESEARCH OR DEVELOPMENT

This invention was made with Government support under Contract DE-AC0576RLO1830 awarded by the U.S. Department of Energy. The Government has certain rights in the invention.

FIELD OF THE INVENTION

The present invention relates to the field of data analysis. More specifically, the present invention relates to visualized data analysis.

BACKGROUND OF THE INVENTION

Big data for visual analytics has posed problems for users to train the underlying analytic models. Traditional approaches rely on users to understand the models and explicitly control their parameters to steer them.

SUMMARY OF THE INVENTION

The visual analytic system enables information retrieval within large text collections. Typically, users have to directly and explicitly query information to retrieve it. With this system and process, the reasoning of the user is inferred from the user interaction they perform in a visual analytic tool, and the appropriate information to query, process, and visualize is systematically determined.

DETAILED DESCRIPTION OF THE PREFERRED EMBODIMENT

Figure 1:
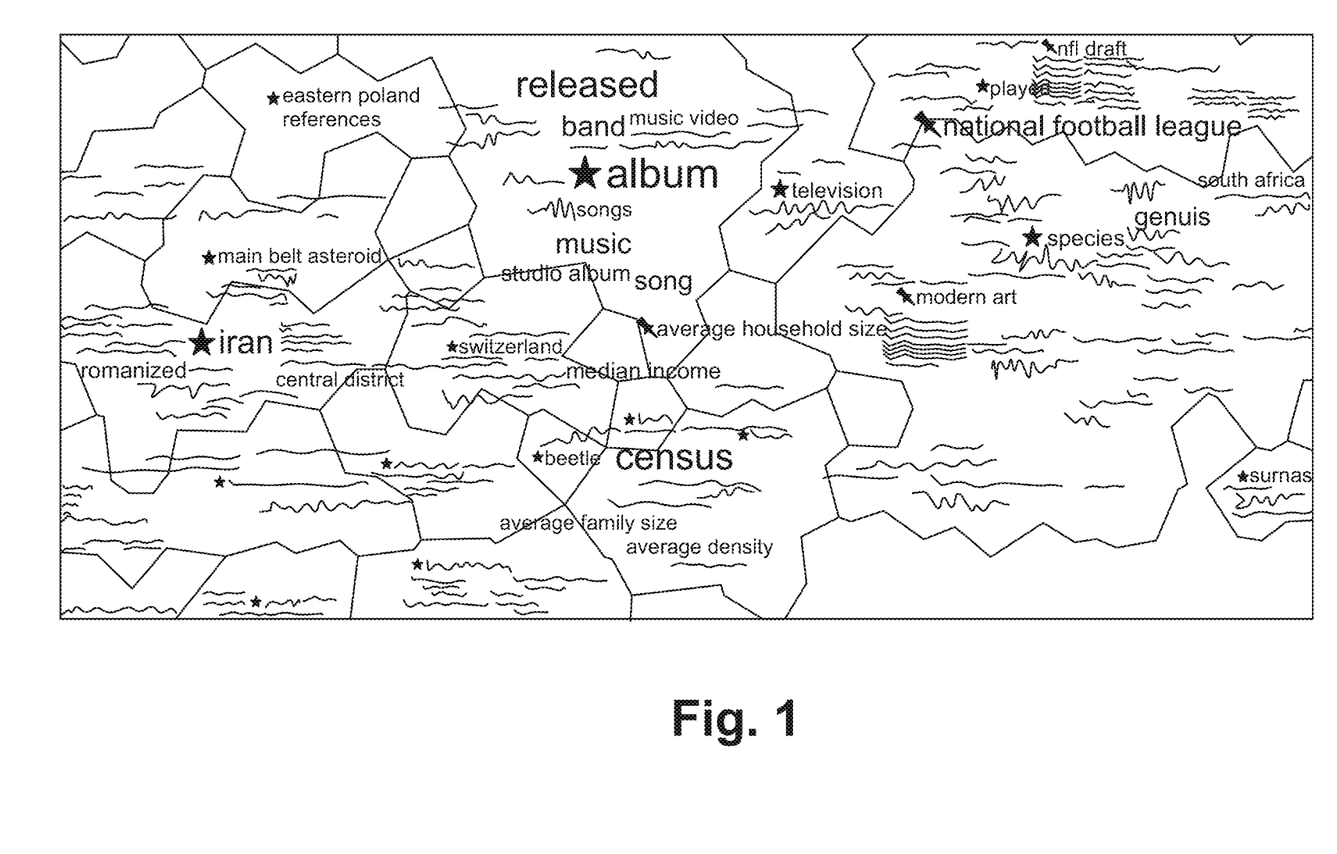
FIG. 1 illustrates a visual analytic system visualizing English Wikipedia according to some embodiments.

Visual data exploration enables users to gain insights into their data by supporting an interactive discourse with their information. Users are able to engage in sensemaking tasks through the iterative testing of assertions and hypotheses supported by their domain expertise. The ability to visualize and interact with information is critical to the success of such visual analytic systems. As the scale of datasets increase, the visual and interaction paradigms should evolve to adapt to such scale. TexTonic, a visual analytic system for interactive visual exploration of large text corpora in a single, multi-scale spatial layout is such an evolution. The visual analytic system visualizes data at multiple levels of aggregation (terms, phrases, snippets, and full documents) in a spatial layout where distance between terms represents the relative similarity between terms. Users are able to interactively explore the data through the use of semantic interactions that enable direct manipulation of information within the spatial metaphor, from which the system infers analytical reasoning and steers the underlying data model and representative visual model. For example, users are able to drag and move two terms closer together to increase their relative similarity (and underlying value in the text model). FIG. 1 illustrates visual analytic system visualizing English Wikipedia including over 4 million documents spatially according to some embodiments.

Visual data exploration enables users to explore and discover insights from data. The visual representations generated map data characteristics to visual encodings in order to engage the perceptual and cognitive processes of users to detect patterns, relationships, and other informal insights about the information. Equally important to the success of these tools is the ability for users to reason about information via testing hypotheses, assertions, and ultimately gaining insights. Thus, the core principles of successful visualizations for discovery are to present visual representations of the information and enable exploration through user interactions. Described herein is an approach for how these two components (the visualization and the user interaction) are able to scale to accommodate visual data exploration of large text corpora.

The cognitive processes users engage in for discovery are able to be broadly categorized as sensemaking—the ability to map one's own understanding and assumptions of the world onto the data being analyzed. The ability for users to explore data via testing of hypotheses and assertions is critical to the success of discovery-oriented visual analytic tools. Sensemaking emphasizes the decomposition of the similarities and differences between one's own understanding of a phenomena or concept (e.g., comparing one's previous "data frame" with the information or knowledge gained through exploring the data). Then, after internalizing the information, one recombines the relevant parts to generate a holistic understanding of the concepts and relationships exhibited in the information being explored.

Figure 2:
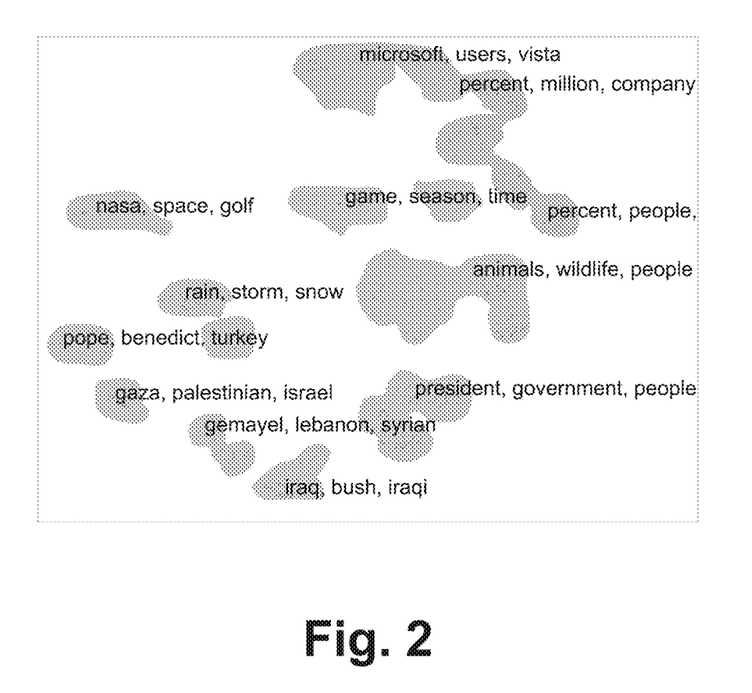
FIG. 2 illustrates a spatialization of text documents in a geospatial metaphor, where topics between documents are visually presented by clusters according to some embodiments.

The analysis of text documents is one domain where visual analytic systems have shown success in fostering sensemaking For example, IN-SPIRE™, a visual document analysis program, allows users to view text documents in a number of views, including the "Galaxy View" spatialization (shown in FIG. 2). This view represents documents as dots organized by their relative similarity (e.g., the "near=similar" geospatial metaphor) to reveal topics within the datasets represented as proximal sets of documents shown visually as clusters. Users are able to perceive these clusters and gain an overview of the dataset being visualized. Users are able to interact with such systems through performing direct manipulation of model parameters through graphical controls (e.g., sliders, knobs). These interactions perform explicit modifications to the underlying computational model used to process and visualize the data. Such models include: entity selection and extraction models, dimension reduction models, topic models, or other models. However, as datasets increase in size and complexity, these two components (the visual representation and the user interaction) of visual analytic systems should scale to continue to support sensemaking and discovery.

An approach for visual exploration of large text corpora is described herein. A visual analytic system for text analysis called TexTonic (shown in FIG. 1) is implemented. The visual analytic system approaches scaling the visual representation through showing multiple levels of detail of the data within a single spatial layout (e.g., a spatialization). Text is visualized in multiple levels of aggregation (terms, phrases, snippets, and full documents) within a single spatial view (shown in FIG. 1). The system adjusts the distribution among these levels of aggregation based on the inferred topics of interest calculated from the user interactions performed. The approach to scale the user interaction comes via a series of user interactions that fall within the design space of semantic interaction. The interactions allow users to directly interact with the information shown in the spatialization (e.g., enlarging/shrinking the terms, rearranging the layout of the information), from which the system interprets the analytical reasoning and steers the underlying mathematical model. The steering takes place on the dimensionality reduction, entity extraction, entity weighting, and information retrieval stages of the underlying analytic models in visual analytic system. The affordance provided is that the reasoning users indicate on a small subset of the information is extrapolated (via the model steering) into the larger dataset. The ability for visual analytic system to afford discovery of large text corpora is evaluated through presenting the results of a user study asking users to analyze all of English Wikipedia (over 4 million documents).

Visualizing Text Spatially

Visualization is a powerful mechanism to present text datasets to users. One popular approach for visualizing text is through the use of a geospatial metaphor, where relative distance between points (e.g., documents) is used to represent relative similarity. For example, IN-SPIRE's "Galaxy View" (shown in FIG. 2) leverages such a geospatial metaphor to represent a document collection spatially. Their work demonstrates how documents can be defined as a weighted vector of keywords, and therefore relationships between documents can be visualized based on their keyword co-occurrence using a dimension reduction model. Similarly, STREAMIT and ForceSPIRE, semantic interaction programs for visual analytics, show documents in a spatialization using a force-directed layout, where edges (or springs) between the nodes (or documents) are a summation of the shared weighted keywords. Additional work has used a computed spatial layout based on the data-characteristics to show documents in spatializations.

Visually presenting overviews of large amounts of text has been approached by showing visualizations of terms or keywords in a dataset, as opposed to the document-centric visualizations described previously. This approach to scale the visual representations has resulted in visualizations that are commonly referred to as "tag clouds," "word clouds," and "Wordles." These approaches focus on showing terms used in a dataset based on their frequency, and optimizing the reduction of whitespace within a bounded area. Font sizes and color ramps are popular visual encodings for showing these quick, quantitative overviews of data. The relative distances between terms shown in these visualizations do not typically carry any intentional meaning.

Work has been done to extend this metaphor of term-centric spatializations by adding meaning to the spatial positioning of the terms. For example, techniques exist for generating a context-preserving word cloud based on similarity metrics between the terms including frequency of use and parts-of-speech relationships. Leveraging these relationships allow these approaches to apply mathematically generated locations to the terms, such as force-directed layouts or multidimensional scaling. For larger datasets, a similar multi-scale word cloud approach has been shown to enable users to zoom into areas of the visualization to retrieve more details.

Additional work applies these spatialization techniques to Wikipedia as a dataset. For example, a spatialization of all of the content of English Wikipedia has been created through the use of the semantic content in the markup meta data generated by the users of Wikipedia (e.g., the topics, categories, and additional meta data used in the wiki). A "Wikipedia world map" that adheres to the geographic metaphor even more closely has been developed. The work represents Wikipedia content as a geographic terrain, where peaks and valleys are created based on the amount of information about a topic (similar to the "SPIRE ThemeView" visual metaphor, VxInsight, a knowledge mining tool).

Spatializations for Sensemaking

Visual data exploration lends itself well to discovery-oriented sensemaking tasks. These tasks focus on the ability for users to decompose a complex task and dataset into smaller, more basic components, then reassembling these to form insight. This process has been described as the ability to map a user's domain expertise, prior knowledge, and perceptions onto the structure and phenomena within a dataset. The ability for users to explore and interact with visual representations enable them to test how well this mapping between their expectations of the phenomena and the data holds true. This iterative testing and confirming is one method enabling users to gain insight through discovery and exploration.

The ability for users to manually craft spatial layouts of text has also been explored. For example, Andrews et al. observed analysts solving a fictitious text dataset using a large, high-resolution display enabling them to sort and place text documents into personally-defined locations and clusters. Their work showed that users could externalize complex cognitive artifacts regarding their sensemaking tasks into the spatial organization of their dataset (e.g., lists, clusters, piles). Similarly, work has been presented that shows the intricacies of these spatial layouts that users generate, and the complexities involved in systematically understanding the spatial constructs that users create. The process of continually modifying one's meaning with respect to adapting spatial constructs is referred to as "incremental formalism."

This prior work grounds the thinking with regard to leveraging spatial metaphors for discovery-oriented tasks. Further, a spatial metaphor has proven to be a successful medium for implementing semantic interaction, described below. In this approach, the metaphor is overloaded, providing both (1) a means for a system to visualize the results of the model approximation of how the information can be organized and clustered, and (2) give users a means to communicate their domain expertise regarding the data to the system by moving and re-organizing the space directly.

Semantic Interaction

Semantic interaction is a design space for user interaction that tightly couples the visual encoding and metaphor of the visualization with the method for user interaction. The approach enables users to integrate their domain expertise into the visual analytic system by directly manipulating the information within the visual metaphor. Therefore, the calculations translating data characteristics into visual encodings are inverted when the user interacts with them so as to infer analytical reasoning from the interaction performed. Endert et al. present a model for semantic interaction that depicts the difference between such implicit model steering versus explicit, direct control of model parameters. Their model shows how the focus of semantic interaction is on performing the user interaction within the visual metaphor, as opposed to directly on graphical controls of model parameters. There is a component of implicitly capturing and interpreting the user interaction with respect to the underlying mathematical model. This differs from the explicit changes that can be performed through direct manipulation methods, such sliders and other graphical interface components intended to directly control the model parameters.

Much of the work on semantic interaction has focused on the steering of dimension reduction models. For example, by directly interacting with the spatial layout by repositioning data objects, users are able to influence the dimension reduction feature weighting of popular models including principal component analysis, multi-dimensional scaling, generative topographic mapping, and force-directed layouts. The common strategies among these approaches is to solve for a weighting schema across the feature space that corresponds with the user-determined placement of the data points in the spatialization.

The implementations described herein extend the body of work around semantic interaction in two ways. First, the principles of semantic interaction are applied to a visualization that supports directly manipulating a spatialization containing features of the data (e.g., terms instead of documents). Second, the facets of the underlying model being steered are broadened. In addition to the dimension reduction component of the visual analytic system (e.g., the force-directed layout), steering entity extraction and selection is explored, as well as information retrieval aspects of the underlying model to present increasing amounts of detail as the model captures the interest of the user regarding specific topics.

System Description

TexTonic is a visual analytic system designed to enable visual data exploration of large text collections. To describe the system, three primary components are presented: the visual metaphor, the user interactions, and the underlying analytics and data processing. The visual analytic system leverages semantic interaction principles that enable user interactions from which the system infers analytical reasoning and steers the underlying mathematical model (see Table 1 for a description). To leverage this design space of user interaction, the visual analytic system uses four information aggregation levels (terms, phrases, snippets, and documents). They are all displayed in a single spatial metaphor (FIG. 1) adhering to the geospatial "near=similar" metaphor. The visual representations of the information in the visual analytic system serve two roles: (1) to visually represent the model-computed characteristics of the information, and (2) to expose opportunities for users to interact with them and explore the dataset via directly interacting with the information in the visualization. In the discussion of the system below, as well as the screenshots, the data being shown is all of the English Wikipedia containing over 4 million documents, from which 10,000 features are initially extracted (creating a 10,000 by 10,000 entity similarity matrix).

Data Processing Pipeline

The visual analytic system includes a server and a client. The server handles the data storage, parsing, and processing of the raw, unstructured text files. This section describes the sequences of processing and data transformation that is handled on the server prior to communicating with the client to create the visual metaphor.

Entity Extraction and Weighting

The server begins by ingesting unstructured text documents. In the case of all of English Wikipedia, this equates to over 36 Gb of files. These files are passed through an entity extractor (in this case RAKE, but others could be integrated into the modular architecture) that selects the top 10,000 entities (keywords and short phrases) that can be used to describe the dataset, and their corresponding occurrence counts. In addition to this subset of entities, the visual analytic system maintains a Lucene index of all the unique keywords mapped to the documents they were extracted from. An index of "associated keywords" that RAKE produces is also maintained to represent synonyms or alternate spellings of a keyword. Further, RAKE generates a matrix representing the pairwise similarity between entities extracted into the top 10,000 above. This initial entity extraction and indexing step takes 13 hours to perform for the first time on a server with (2) 6-core Intel Xeon X5650 processors and 48 Gb RAM.

Clustering

These artifacts generated from the entity extraction step (the similarity matrix, term scores, Lucene index, and associated keywords file) are then stored on the visual analytic system server as a "dataset." From here, these indexes are leveraged to produce a graph layout to send to the client. Then, k-means clustering is run over the high dimensional similarity matrix to produce a set of clusters and cluster centroids. The centroids of the clusters are then used as input to a RAKE function that produces a dendrogram given the weighted cluster membership. The centroids for all clusters are then passed through Principal Component Analysis to reduce their dimensionality from 10,000 dimensions to two.

These coordinates are used as the seed locations (the location of the starred terms) in the initial view generated.

Graph Generation

Figure 3:
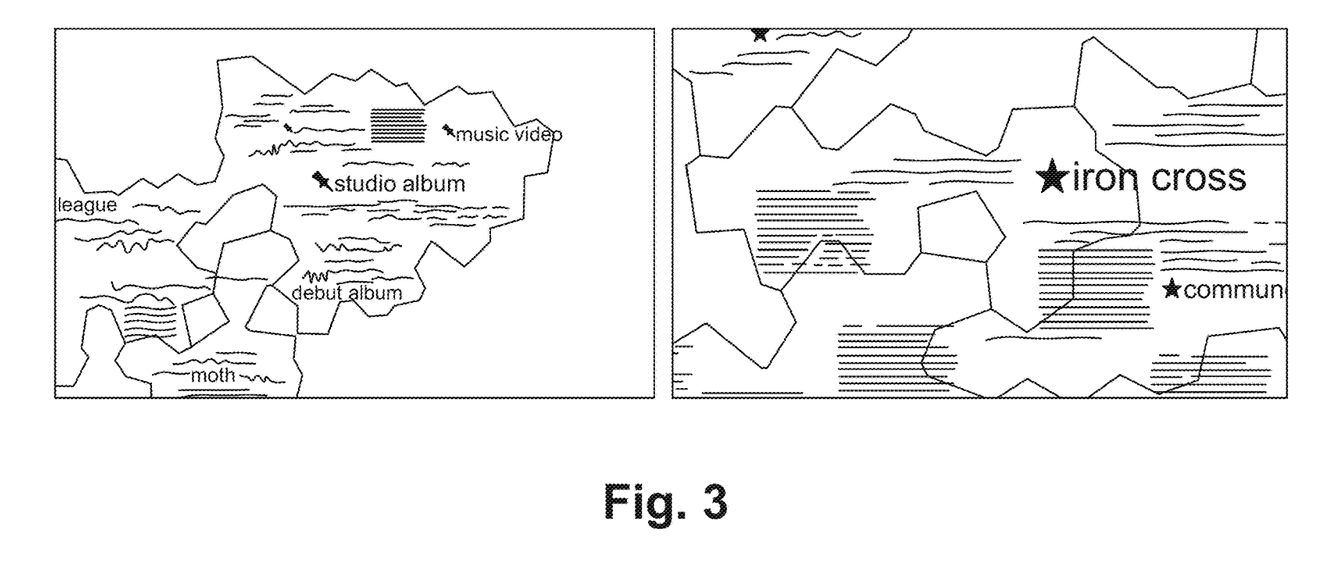
FIG. 3 illustrates zooming in on different regions ("studio album" on the left, "iron cross" on the right) reveals additional detail at multiple levels of aggregation (terms, phrases, and snippets), where hovering over a snippet (on the right), highlights the hierarchy stemming from the detail to the key term within a cluster, according to some embodiments.

To produce a graph of multiple levels of detail from the original data, the first step is to transform the entity-by-entity similarity matrix into a graph. Each node is an entity, and the weight of the edges between nodes is determined by the similarity score from the matrix. Next, each of these entities is assigned a snippet, computed by using the Lucene index to search for a short subset of a document that has a high density of terms that have a high similarity score to the entity. These snippets range from 25 to 50 words in length. The location of each data object (e.g., terms, snippets, phrases, and documents) is determined using a force-directed layout. The graph model represents each data object as a node, with edges representing similarities between each. While the data is modeled using a graph, edges are not made visible in the visualization. Instead, users are able to reveal the hierarchical topic relationship by hovering over any term, phrase, or snippet (see FIG. 3). As a result, the "near=similar" visual metaphor is generated, where distance between the information is used to encode relative similarity.

The clustering results from the previous step are used to generate the "starred" terms (e.g., "iron cross" in FIG. 3), as well as determine sets of terms to be colored identically. The highest weighted entity within a cluster is assigned a "star" flag, to be used in the later visualization construction. Once these steps are complete, the entire graph object is sent to the client when the data is requested.

Visual Metaphor

The visual analytic system has a single primary visual metaphor to represent the information, shown in FIG. 1. The visualization represents phrases, terms, snippets, and documents spatially using different colors, sizes, and locations. In addition to terms, phrases, snippets, and full documents are visually represented. The visual analytic system aims to show multiple levels of aggregation of information to the user within the same visual metaphor, through calculating the saliency of the information via the similarity matrix and weighting schema. That is, each level of aggregation is assembled into a hierarchy based on a sum of the weights of its entities (normalized to control for length). Thus, only a select set of the information is visible (or even loaded into memory on the client) at any given time. The visual analytic system calculates the most salient set of terms, phrases, and snippets to be loaded into the client and rendered in the visualization. While the size of that set is configurable in a control panel, the default calculates a number based on the total display resolution made available to the visual analytic system. As a result, the user interaction performed by the user steers not only the immediate graph (and corresponding force-directed layout to determine the locations), but also the information retrieval (or saliency) function that queries for information from the server and adds it to the graph and visualization.

The color of a data object represents the cluster that it belongs to. Each cluster is given a unique color, which is also used to shade the background of the cluster to show cluster membership from further zoom levels (and physical distances from the display) where the color of the terms may not be as readily perceived. The colors are chosen from a palette of possible colors in a configuration file, but can be changed manually if requested by the user. The star depicts a "capital," or representative term for a specific cluster or topic. Each topic has one starred term.

Sizes of terms and phrases are calculated based on the weight assigned to them by RAKE. Therefore, similar to the approach taken by Wordles, a program for generating word clouds, larger sized terms represent higher weighted terms (e.g., terms that are computed to be more important and descriptive to the dataset).

User Interactions

The user interactions in the visual analytic system are designed to help users visually explore the dataset. They are summarized in Table 1 (see below). Many of these interactions follow the design principles of semantic interaction, in that they operate on a bi-directionality of the visual encodings used to create the visualization That is, the techniques used to encode specific attributes of the data visually also serve as the methods for interacting with the underlying models (including changing the weighting matrix, guiding the information retrieval method, and steering the feature extraction model). Below, is described how each interaction updates the visualization and the underlying models.

TABLE 1

The user interactions incorporated in the visual analytic system, and how they map to the user's analytical reasoning, and ultimately steer the underlying analytic model.

| User Interaction | Analytical Reasoning | Model and Visual Interpretation |
|---|---|---|
| Move Term | Create cluster of similar terms or topics | Solve for term vector weighting that reflects increased similarity between terms (or decrease weight to reflect dissimilarity if moved apart) |
| Resize Term | Change visual dominance or importance of term | Enlarging a Term: Increase the term's weight across the entire dataset Shrinking a Term: Decrease the term's weight across the entire dataset |
| Pin Term | Create a spatial landmark for the term or topic | The term creates a spatial constraint for the layout model, forcing other objects to organize with respect to the pinned terms |
| Delete Term | Remove the term from the dataset (e.g., flag as stopword, not relevant) | The weight of the term is set to zero, resulting in no emphasis placed on the term for similarity calculations, and removal from the visualization |
| Search | Directed search for a term or phrase | Create a search node, retrieve search hits, dim non-hits. The search term's weight is increased in the model. |

Figure 5:
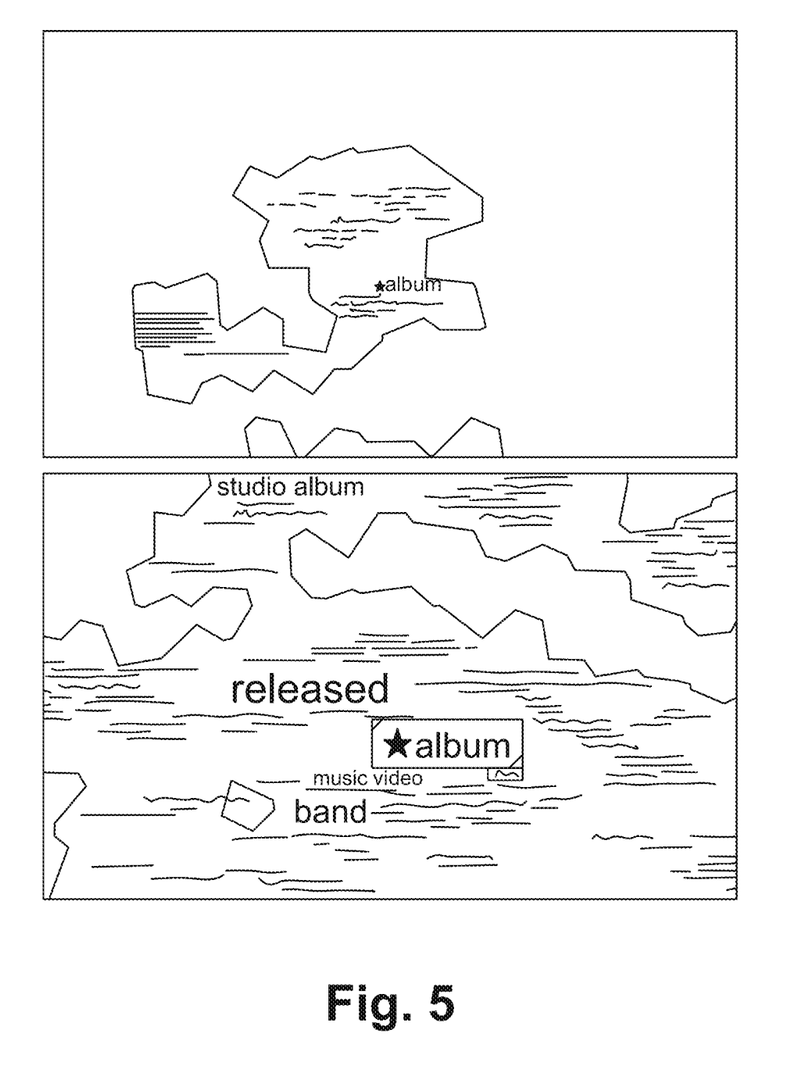
FIG. 5 illustrates enlarging the term "album" which steers the model and visualization to retrieve additional information, and the transition between the top and bottom images shows this information retrieval functionality, according to some embodiments.

In an attempt to make most of the visual encodings bi-directional, users are able to adjust the sizes of terms and phrases directly in the visualization. Changing the size of a term will change the weight assigned to that term in the feature matrix. As a result, any edges in the graph that contain the feature will become stronger, thus tightening the clustering around the specific term that was enlarged. Additionally, the change in the weight matrix steers the information retrieval methods to find additional information in the dataset that may not have been immediately stored in the graph. For example, FIG. 5 shows the effect of enlarging the term "album," retrieving additional terms and phrases about "album" from the dataset.

Term movement is another example of adapting such existing semantic interaction principles in the visual analytic system (phrases can also be moved with the same effect).

Figure 4:
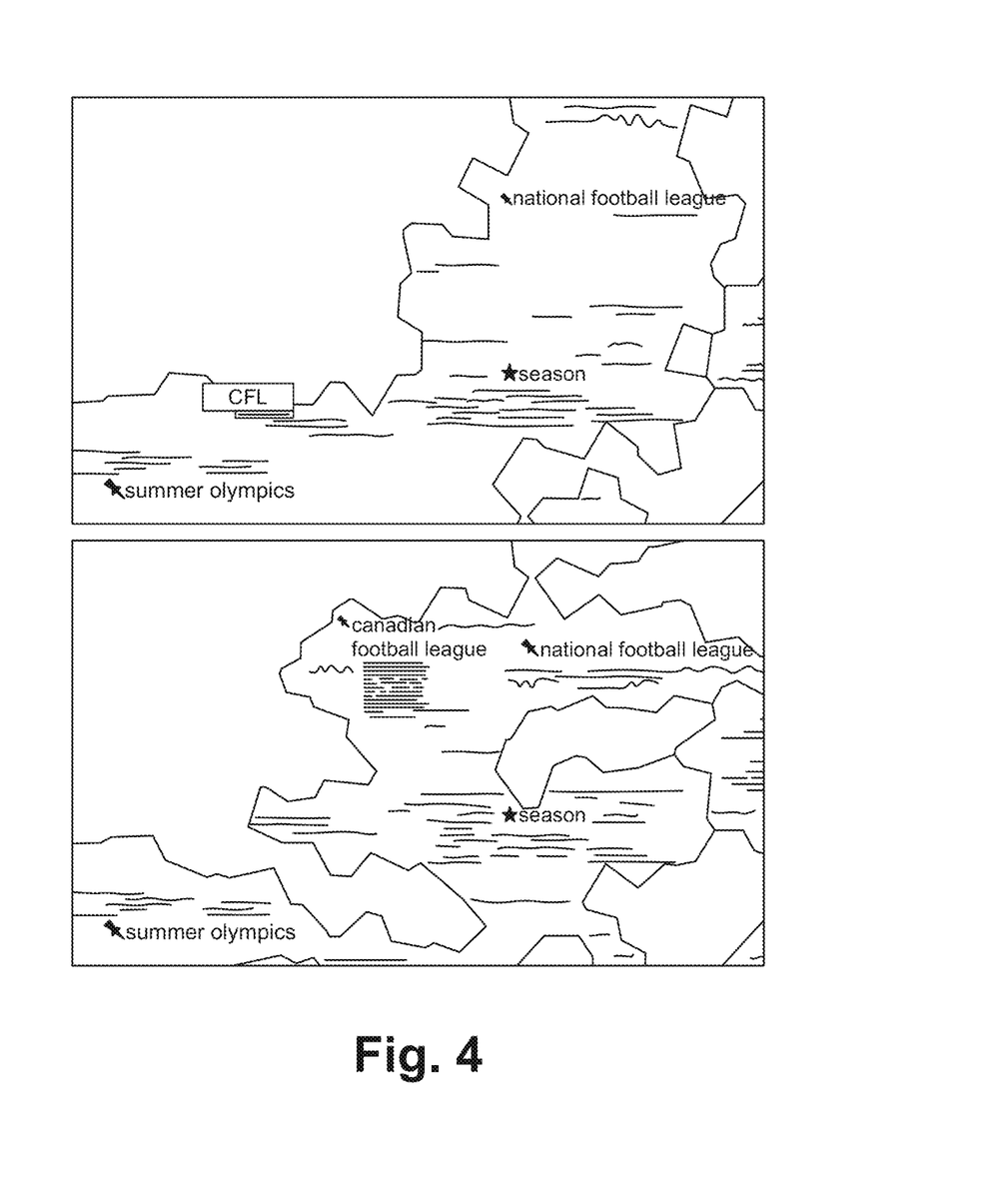
FIG. 4 illustrates moving "Canadian football league" closer to "national football league" which retrieves additional information regarding the two sport leagues, according to some embodiments.

The repositioning of terms in the spatialization is a means for users to reflect their assertions and hypotheses regarding the clustering and relative similarity between information. The visual analytic system takes a similar approach to ForceSPIRE, but instead allows the repositioning of terms, leveraging the RAKE topic extraction methods to determine what features to emphasize from the interaction. Using the feature matrix, the features that are shared between the terms moved closer together are determined and their weight is increased by a user-defined constant, and the weight of the features that are not shared is uniformly decreased. As a result, edges to other terms, phrases, and snippets are strengthened if they contain the upweighted features, and are thus brought closer as a result of the force-directed layout. FIG. 4 shows an example of moving two terms closer together, resulting in more relevant information regarding the two terms to be visualized.

Calculating the model update based on movement of data has been shown to be sensitive to how, and against what other objects, the update calculation is performed. For example, in ForceSPIRE only a small subset of "pinned" documents are used to calculate what features in the high-dimensional term vectors to up-weight. The tradeoffs inherent in the methods for calculating the updated feature weighting matrix have been discussed, ranging from comparing against all other data objects in the space to only performing pairwise comparisons. The visual analytic system calculates the changes in distance between the term being moved and all other pinned terms or phrases. Pinned terms or phrases serve as landmarks in the spatialization (receiving a pin icon, shown in FIG. 3), as well as targets against which the movement of terms can be calculated against. For example, when a user moves a term, only the feature vectors of pinned terms are taking into consideration in solving for a new weighting schema. Thus, the actual calculation for updating the weighting schema is adapted, with a difference being that the visual analytic system computes on document vectors instead of entity vectors.

Terms are able to be deleted in the visualization by selected the term, phrase, or snippet and choosing the garbage can icon from the menu. Terms that are deleted have their weighting matrix values set to zero. In turn, this removes them from the visualization (as the term is not considered salient anymore), and also removes the influence the term has on the graph and clustering models (e.g., any edges that contain the term are weakened).

In addition to the more detailed information that is able to be retrieved via the information saliency methods described above, users are also able to explicitly request more detail. Double-clicking on a term or phrase will reveal the top 8 snippets. These snippets are retrieved based on the highest Lucene index score. Similarly, double-clicking on a snippet will reveal the full document.

Figure 6:
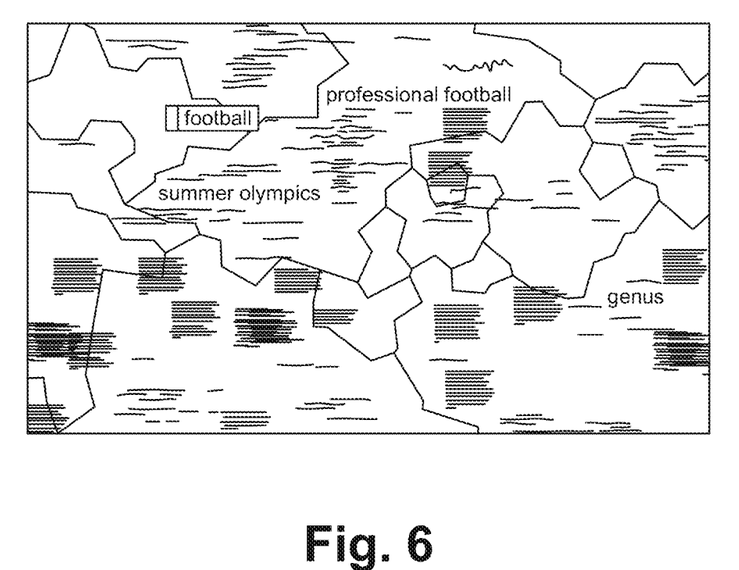
FIG. 6 illustrates searching for a term (in this case "football") retrieves details regarding that term specifically, fading other information out to draw visual attention towards the search hits, according to some embodiments.

The visual analytic system has a plain text search feature. Users are able to enter text into the search box. The search takes place on the entire similarity matrix (not just what is visible). In some embodiments, the search takes place on just what is visible. Any search results are retrieved and made visible, while the existing visible terms that do not match the search are dimmed (see FIG. 6). Each search result is upweighted in the weighting schema (using the same user-defined constant) to reflect a user's interest in this aspect of the data. Once the user is satisfied with exploring the search results, she is able to close the search dialog box. The grey layer is removed, and the visualization returns to the normal state. However, if the search results that received the increase in their weight are above the saliency threshold, they remain visible. Another option users have is to "pin" select search results, which changes their weight to remain visible upon closing the search dialog.

The spatial canvas also enables users to pan and zoom. The fonts re-render at each zoom level to ensure proper kerning and rendering. Other functionality in the visual analytic system includes loading different datasets and a configuration menu that includes adjusting parameters of the data processing and visualization algorithms.

Malleable Data Similarity Matrixes

Described herein is how the visual analytic system presents a model of scaling the visualization and user interaction paradigms to afford visual data exploration of large text datasets. The approach hypothesizes that through enabling implicit model steering via semantic interaction, data similarity matrixes that can adapt to the changing interests of users exploring a dataset are able to be generated. These matrixes (typically rows representing documents and columns representing features) provide the structure for the dataset against which visual encodings and metaphors can be mapped.

The visual analytic system enables steering of both the rows (documents) and columns (features) implicitly. That is, as the user interest is inferred, rows can be added and removed from the matrix to represent different facets of the dataset that a user is exploring. Further, the features describing the dataset can be varied over time given the interest of the user, or the particular stage of the analytic process. This opportunity presents challenges for visual analytics, including how to minimize forms of cognitive bias, and how to ensure model coverage of large and complex datasets. Such malleability in the data structure is important when interactively exploring large and complex datasets, as the increasing size and complexity of such data will require an adaptable model to afford the changing contextual explorations performed by users.

Figure 7:
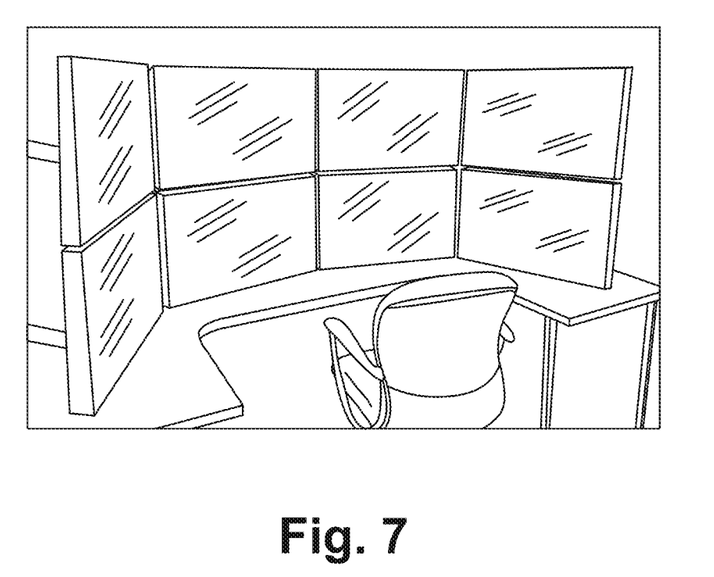
FIG. 7 illustrates the visual analytic system on a large, high resolution display according to some embodiments.

FIG. 7 illustrates the visual analytic system on a large, high resolution display according to some embodiments. The visual analytic system is able to be displayed on any display; however, in some embodiments, the visual analytic system is displayed on very large displays (e.g., 8 or more individual 24 inch displays or size 70 inch or more displays).

Figure 8:
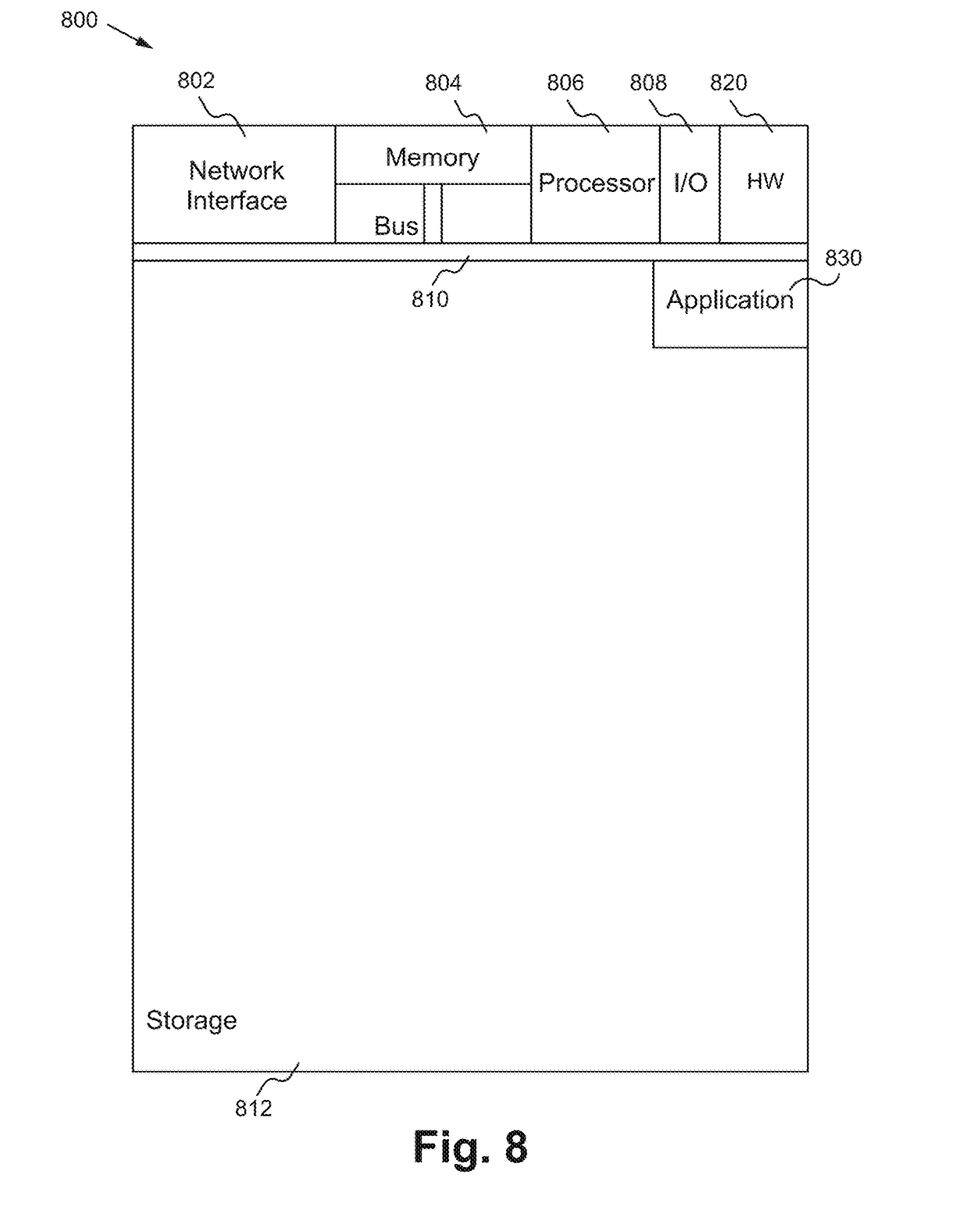
FIG. 8 illustrates a block diagram of an exemplary computing device configured to implement the visual analytics tool according to some embodiments.

FIG. 8 illustrates a block diagram of an exemplary computing device configured to implement the visual analytics tool according to some embodiments. The computing device 800 is able to be used to acquire, store, compute, process, communicate and/or display information. In general, a hardware structure suitable for implementing the computing device 800 includes a network interface 802, a memory 804, a processor 806, I/O device(s) 808, a bus 810 and a storage device 812. The choice of processor is not critical as long as a suitable processor with sufficient speed is chosen. In some embodiments, the computing device 800 includes multiple processors to implement parallel processing. The memory 804 is able to be any conventional computer memory known in the art. The storage device 812 is able to include a hard drive, CDROM, CDRW, DVD, DVDRW, High Definition disc/drive, ultra-HD drive, flash memory card or any other storage device. The computing device 800 is able to include one or more network interfaces 802. An example of a network interface includes a network card connected to an Ethernet or other type of LAN. The I/O device(s) 808 are able to include one or more of the following: keyboard, mouse, monitor, screen, printer, modem, touchscreen, button interface and other devices. Visual analytics tool application(s) 830 used to implement the visual analytics tool are likely to be stored in the storage device 812 and memory 804 and processed as applications are typically processed. More or fewer components shown in FIG. 8 are able to be included in the computing device 800. In some embodiments, visual analytics tool hardware 820 is included. Although the computing device 800 in FIG. 8 includes applications 830 and hardware 820 for the visual analytics tool, the visual analytics tool is able to be implemented on a computing device in hardware, firmware, software or any combination thereof. For example, in some embodiments, the visual analytics tool applications 830 are programmed in a memory and executed using a processor. In another example, in some embodiments, the visual analytics tool hardware 820 is programmed hardware logic including gates specifically designed to implement the visual analytics tool.

In some embodiments, the visual analytics tool application(s) 830 include several applications and/or modules. In some embodiments, modules include one or more sub-modules as well. In some embodiments, fewer or additional modules are able to be included.

Examples of suitable computing devices include a high performance computing system, a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, an augmented reality device, a virtual reality device, a home entertainment system, smart jewelry (e.g., smart watch), any other suitable computing device and/or a combination thereof.

In some embodiments, the visual analytics tool is implemented using networked devices (e.g., cloud computing). For example, multiple servers implement the back end of the visual analytics tool, and a client device (e.g., user computer) displays the front end of the visual analytics tool.

Figure 9:
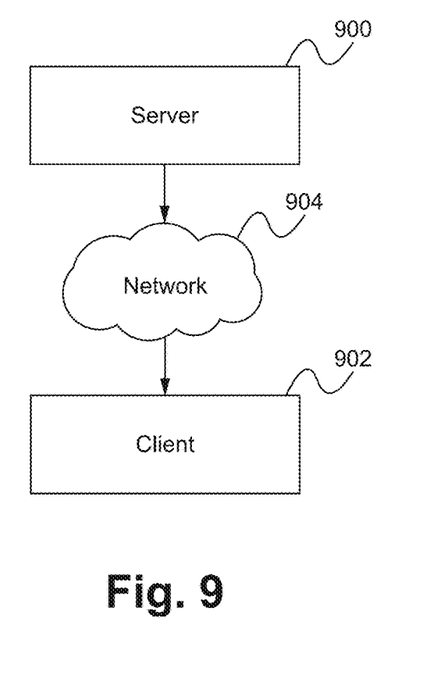
FIG. 9 illustrates a client/server implementation of the visual analytics tool according to some embodiments.

FIG. 9 illustrates a client/server implementation of the visual analytics tool according to some embodiments. A server device 900 and a client device 902 communicate through a network 904 or directly. The server device 900 handles the data storage, parsing, and processing of the raw, unstructured text files. The server device 900 performs processing and data transformation prior to communicating with the client device 902 to generate the visual metaphor. The server device 900 leverages indexes to produce a graph layout (e.g., a graph object) which is sent to the client device 902. The client device 902 displays the visual metaphor. In some embodiments, only a select set of the information is visible (or loaded into the memory of the client device 902) at any given time. The client device 902 is able to be any device such as a personal computer or workstation with one or more displays (e.g., 8 displays). The network 904 is able to be any network such as a wireless network, cellular network, the Internet, or a combination thereof. In some embodiments, fewer or additional devices are utilized.

Figure 10:
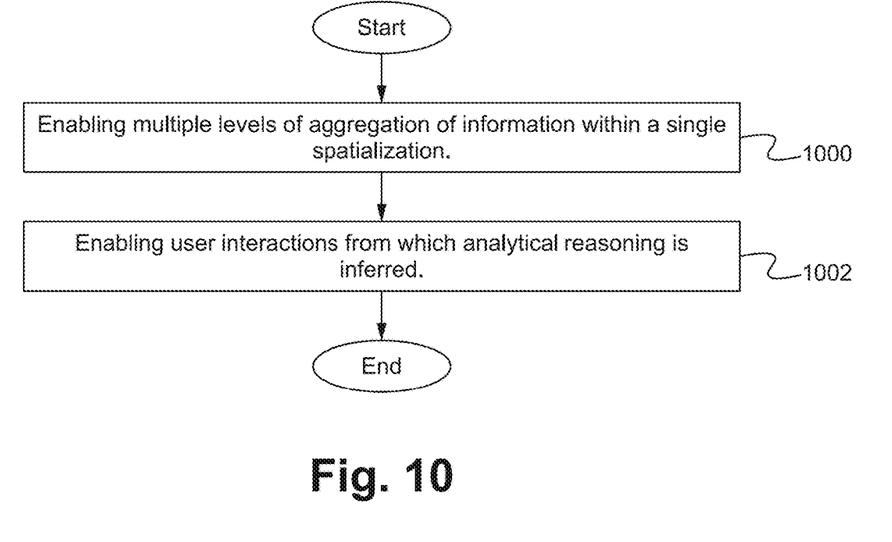
FIG. 10 illustrates a flowchart of implementing the visual analytics tool according to some embodiments.

FIG. 10 illustrates a flowchart of implementing the visual analytics tool according to some embodiments. In the step 1000, multiple levels of aggregation of information within a single spatialization are enabled. The multiple levels of aggregation include, but are not limited to, terms, phrases, snippets, and full documents. The distance between terms in the spatialization represents relative similarity between the terms. The multiple levels of aggregation are shown to a user within the same spatialization through calculating saliency of the information via a similarity matrix and weighting schema. Each level of aggregation is assembled into a hierarchy based on a sum of the weights of its entities. The calculated salient information is loaded into the client and rendered in the visualization. In the step 1002, user interactions from which analytical reasoning is inferred are enabled. The user interactions include semantic interactions that enable direct manipulation of information within the spatialization. User interactions include, but are not limited to, moving terms, resizing terms, pinning terms, deleting terms, and text searching for terms or phrases. In some embodiments, implementing the visual analytics tool includes additional steps such as steering an underlying analytic model and adjusting the distribution among the levels of aggregation based on inferred topics of interest calculated from the user interactions performed. In some embodiments, fewer or additional steps are implemented. In some embodiments, the order of the steps is modified.

To utilize the visual analytic system, a user interactively explores a spatial visual metaphor of the information generated by the visual analytic system, which incorporates multiple levels of detail into a single spatialization. The user is able to select, move, manipulate the spatial visual metaphor as well as perform searches of the data.

In operation, the visual analytic system is a visual analytics tool for interactive exploration of large text corpora. The visual analytic system takes the approach of creating a spatial visual metaphor of the information, incorporating multiple levels of detail into a single spatialization. The spatialization contains terms, phrases, snippets, and documents in a single visualization, providing detail in the context of the higher-level, aggregated topics and terms of the dataset. The user interaction methodology in the visual analytic system expands upon the semantic interaction design space, in that the user interactions are designed to be in the visual metaphor, and on the data. That is, the visual analytic system infers the analytic reasoning of the user's interaction to steer the underlying analytic models for entity extraction, information retrieval, and dimension reduction. As a result, the visual analytic system provides a scalable approach to visualizing, and interacting with, large text corpora.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A data visualization and interaction system comprising:
   a. a processor;
   b. a set of eight display devices configured for displaying a spatial layout for implementing multiple levels of aggregation of information within a single spatialization;
   c. an interaction component, wherein the system utilizes user interactions from which the system infers analytical reasoning and steers an underlying analytic model, wherein user reasoning on a small subset of the information is extrapolated into a larger dataset; and
   d. a generation component, using the processor, configured for generating a graphical representation based on the information, wherein the graphical representation represents each data object as a node with edges representing similarities between each data object, wherein the edges are invisible, further wherein a user reveals a hierarchical topic relationship by hovering over the information in the multiple levels of aggregation of information, wherein the system adjusts distribution among the multiple levels of aggregation based on inferred topics of interest calculated from the user interactions performed.

2. The system of claim 1 wherein the multiple levels of aggregation include terms, phrases, snippets, and full documents.

3. The system of claim 1 wherein the distance between terms in the spatial layout represents relative similarity between the terms.

4. The system of claim 1 wherein the user interactions comprise semantic interactions that implement direct manipulation of information within the spatialization.

5. The system of claim 1 wherein the multiple levels of aggregation are shown to a user within the same spatial layout through calculating saliency of the information via a similarity matrix and weighting schema.

6. The system of claim 5 wherein each level of aggregation is assembled into a hierarchy based on a sum of the weights of its entities.

7. The system of claim 5 wherein the calculated salient information is loaded into the client and rendered in the visualization.

8. The system of claim 1 wherein user interactions include moving terms, resizing terms, pinning terms, deleting terms, and text searching for terms or phrases.

9. A method of interactive visual exploration of information comprising:
 a. implementing, using a processor, multiple levels of aggregation of information within a single spatialization on a set of eight display devices;
 b. implementing user interactions from which analytical reasoning is inferred, wherein user reasoning on a small subset of the information is extrapolated into a larger dataset;
 c. generating a graphical representation based on the information, wherein the graphical representation represents each data object as a node with edges representing similarities between each data object, wherein the edges are invisible, further wherein a user reveals a hierarchical topic relationship by hovering over the information in the multiple levels of aggregation of information; and
 d. adjusting distribution among the multiple levels of aggregation based on inferred topics of interest calculated from the user interactions performed.

10. The method of claim 9 further comprising steering an underlying analytic model.

11. The method of claim 9 wherein the multiple levels of aggregation include terms, phrases, snippets, and full documents.

12. The method of claim 9 the distance between terms in the spatialization represents relative similarity between the terms.

13. The method of claim 9 wherein the user interactions comprise semantic interactions that implement direct manipulation of information within the spatialization.

14. The method of claim 9 wherein the multiple levels of aggregation are shown to a user within the same spatialization through calculating saliency of the information via a similarity matrix and weighting schema.

15. The method of claim 14 wherein each level of aggregation is assembled into a hierarchy based on a sum of the weights of its entities.

16. The method of claim 14 wherein the calculated salient information is loaded into the client and rendered in the visualization.

17. The method of claim 9 wherein user interactions include moving terms, resizing terms, pinning terms, deleting terms, and text searching for terms or phrases.

18. An apparatus comprising:
 a. a non-transitory memory for storing an application, the application for:
  i. implementing multiple levels of aggregation of information within a single spatialization;
  ii. implementing user interactions from which analytical reasoning is inferred, wherein user reasoning on a small subset of the information is extrapolated into a larger dataset; and
  iii. generating a graphical representation based on the information, wherein the graphical representation represents each data object as a node with edges representing similarities between each data object, wherein the edges are invisible, further wherein a user reveals a hierarchical topic relationship by hovering over the information in the multiple levels of aggregation of information; and
  iv. adjusting distribution among the multiple levels of aggregation based on inferred topics of interest calculated from the user interactions performed; and
 b. a processor coupled to the non-transitory memory, the processor configured for processing the application.

19. The apparatus of claim 18 further comprising steering an underlying analytic model.

20. The apparatus of claim 18 wherein the multiple levels of aggregation include terms, phrases, snippets, and full documents.

21. The apparatus of claim 18 the distance between terms in the spatialization represents relative similarity between the terms.

22. The apparatus of claim 18 wherein the user interactions comprise semantic interactions that implement direct manipulation of information within the spatialization.

23. The apparatus of claim 18 wherein the multiple levels of aggregation are shown to a user within the same spatialization through calculating saliency of the information via a similarity matrix and weighting schema.

24. The apparatus of claim 23 wherein each level of aggregation is assembled into a hierarchy based on a sum of the weights of its entities.

25. The apparatus of claim 23 wherein the calculated salient information is loaded into the client and rendered in the visualization.

26. The apparatus of claim 18 wherein user interactions include moving terms, resizing terms, pinning terms, deleting terms, and text searching for terms or phrases.

27. The apparatus of claim 18 wherein the information includes an entity-by-entity similarity matrix, wherein each node is an entity and a weight of the edges between nodes is determined by a similarity score from the entity-by-entity similarity matrix, further wherein each entity is assigned a snippet, computed using a Lucene index to search for a short subset of a document that has a density of terms above a density threshold that have a similarity score above a similarity threshold.

28. A data visualization and interaction system comprising:
   a. a processor;
   b. a set of eight display devices configured for displaying a spatial layout for implementing multiple levels of aggregation of information within a single spatialization;
   c. an interaction component, wherein the system utilizes user interactions from which the system infers analytical reasoning and steers an underlying analytic model, wherein user reasoning on a small subset of the information is extrapolated into a larger dataset; and
   d. a generation component, using the processor, configured for generating a graphical representation based on the information, wherein the graphical representation represents each data object as a node with edges representing similarities between each data object, wherein the edges are invisible, further wherein a user reveals a hierarchical topic relationship by hovering over the information in the multiple levels of aggregation of information, wherein the multiple levels of aggregation are shown to the user within the same spatial layout through calculating saliency of the information via a similarity matrix and weighting schema.

29. A method of interactive visual exploration of information comprising:
   a. implementing, using a processor, multiple levels of aggregation of information within a single spatialization on a set of eight display devices;
   b. implementing user interactions from which analytical reasoning is inferred, wherein user reasoning on a small subset of the information is extrapolated into a larger dataset; and
   c. generating a graphical representation based on the information, wherein the graphical representation represents each data object as a node with edges representing similarities between each data object, wherein the edges are invisible, further wherein a user reveals a hierarchical topic relationship by hovering over the information in the multiple levels of aggregation of information, wherein the multiple levels of aggregation are shown to the user within the same spatial layout through calculating saliency of the information via a similarity matrix and weighting schema.

30. An apparatus comprising:
   a. a non-transitory memory for storing an application, the application for:
      i. implementing multiple levels of aggregation of information within a single spatialization;
      ii. implementing user interactions from which analytical reasoning is inferred, wherein user reasoning on a small subset of the information is extrapolated into a larger dataset; and
      iii. generating a graphical representation based on the information, wherein the graphical representation represents each data object as a node with edges representing similarities between each data object, wherein the edges are invisible, further wherein a user reveals a hierarchical topic relationship by hovering over the information in the multiple levels of aggregation of information, wherein the multiple levels of aggregation are shown to the user within the same spatial layout through calculating saliency of the information via a similarity matrix and weighting schema; and
   b. a processor coupled to the non-transitory memory, the processor configured for processing the application.

31. A data visualization and interaction system comprising:
   a. a processor;
   b. a set of eight display devices configured for displaying a spatial layout for implementing multiple levels of aggregation of information within a single spatialization;
   c. an interaction component, wherein the system utilizes user interactions from which the system infers analytical reasoning and steers an underlying analytic model, wherein user reasoning on a small subset of the information is extrapolated into a larger dataset; and
   d. a generation component, using the processor, configured for generating a graphical representation based on the information, wherein the graphical representation represents each data object as a node with edges representing similarities between each data object, wherein the edges are invisible, further wherein a user reveals a hierarchical topic relationship by hovering over the information in the multiple levels of aggregation of information, wherein the user interactions include moving terms, resizing terms, pinning terms, deleting terms, and text searching for terms or phrases.

32. A method of interactive visual exploration of information comprising:
   a. implementing, using a processor, multiple levels of aggregation of information within a single spatialization on a set of eight display devices;
   b. implementing user interactions from which analytical reasoning is inferred, wherein user reasoning on a small subset of the information is extrapolated into a larger dataset; and
   c. generating a graphical representation based on the information, wherein the graphical representation represents each data object as a node with edges representing similarities between each data object, wherein the edges are invisible, further wherein a user reveals a hierarchical topic relationship by hovering over the information in the multiple levels of aggregation of information, wherein the user interactions include moving terms, resizing terms, pinning terms, deleting terms, and text searching for terms or phrases.

33. An apparatus comprising:
   a. a non-transitory memory for storing an application, the application for:
      i. implementing multiple levels of aggregation of information within a single spatialization;
      ii. implementing user interactions from which analytical reasoning is inferred, wherein user reasoning on a small subset of the information is extrapolated into a larger dataset; and
      iii. generating a graphical representation based on the information, wherein the graphical representation represents each data object as a node with edges representing similarities between each data object, wherein the edges are invisible, further wherein a user reveals a hierarchical topic relationship by hovering over the information in the multiple levels of aggregation of information, wherein the user interactions include moving terms, resizing terms, pinning terms, deleting terms, and text searching for terms or phrases; and
   b. a processor coupled to the non-transitory memory, the processor configured for processing the application.

* * * * *